Figure 1:
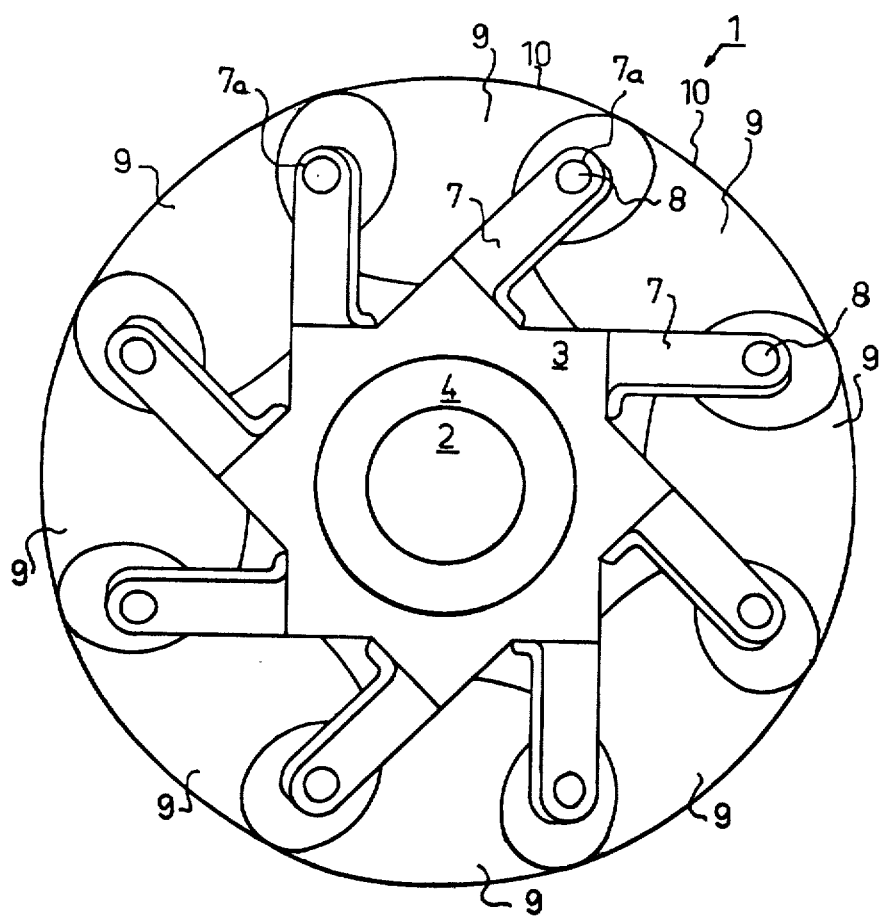

United States Patent [19]

Ilon

[11] 3,876,255
[45] Apr. 8, 1975

[54] WHEELS FOR A COURSE STABLE SELFPROPELLING VEHICLE MOVABLE IN ANY DESIRED DIRECTION ON THE GROUND OR SOME OTHER BASE

[76] Inventor: Bengt Erland Ilon, Stromkarlsvagen 43, 161 38 Bromma, Sweden

[22] Filed: Nov. 13, 1972

[21] Appl. No.: 305,887

[52] U.S. Cl. .............................. 301/5 P; 301/5 R
[51] Int. Cl. ............................................ B60b 19/00
[58] Field of Search ........ 301/5 P, 5 R; 280/DIG. 7; 305/50

[56] References Cited
UNITED STATES PATENTS
3,789,947   2/1974   Blumrich ........................... 301/5 P

*Primary Examiner*—M. Henson Wood, Jr.
*Assistant Examiner*—Reinhard J. Eisenzopf
*Attorney, Agent, or Firm*—John J. Dennemeyer

[57] ABSTRACT

A wheel for a course stable selfpropelling vehicle, having a centre part rotatable about an axis and a plurality of ground engaging means rotatably mounted on the centre part about the periphery thereof. Each ground engaging means being an elongated roll having its surface convexly vaulted in longitudinal direction and being mounted with its axis extending obliquely with respect to the axis of rotation of the centre part. The spacing between the rolls and the angle between the longitudinal axes of the rolls and the axis of rotation being selected so that the rolls define together an unbroken wheel periphery, seen from a point on an extension of the axis of rotation.

15 Claims, 6 Drawing Figures

WHEELS FOR A COURSE STABLE SELFPROPELLING VEHICLE MOVABLE IN ANY DESIRED DIRECTION ON THE GROUND OR SOME OTHER BASE

The present invention relates to improvements in wheels for a course stable selfpropelling vehicle, said vehicle being movable in any desired direction on the ground or some other base, whereby each wheel includes a centre part disposed on a centre axis rotatably positioned transversely to the side of the vehicle and further includes several ground engaging means, which are rotatably mounted on the centre part and distributed around the same.

To drive the vehicle it is previously known to dispose individually drivable rolls or the like along the opposite sides of the vehicle. These rolls are driven to be rotated with the aid of the driving assembly of the vehicle and in order to thereby obtain the required grip on the base, each roll has an exterior flange, spirally positioned around the roll in the longitudinal direction thereof. Devices of this type are especially suited for driving on a yieldable base, such as ice or snow, into which the flanges may cut and thereby obtain the grip. On the contrary, by driving on a hard base there is a risk that the flanges will slip on the surface of the base without obtaining a grip on the same, which results the required course stability and steering ability not being maintained during the driving. Furthermore, in case the surface of the base is rough the flanges may also be exposed to exceptional hard wear.

With due attention paid to this fact it has been proposed to use wheel-shaped driving means on such vehicles and in a known structure each driving means comprises a centre part rotatably mounted on the vehicle and a number of ground engaging means are rotatably mounted in bearings on the centre part distributed around the same. Each of said ground engaging means comprises a relatively narrow pulley and the pulleys are placed on the centre part in an overlapping fashion in relation to each other. In such a wheel structure the periphery line of the pulleys define a broken outer wheel periphery, resulting in the vehicle obtaining an uneven and bumping motion by driving in the normal directions straight forwardly or backwardly.

The purpose of the present invention is to eliminate this drawback and to accomplish a wheel-shaped driving means having a fully unbroken outer periphery of the wheel in order to obtain a smooth driving motion.

For this purpose the invention is essentially characterized in that each ground engaging means has the shape of an elongated roll with the outer side convexely vaulted in the longitudinal direction thereof, whereby each roll is disposed on the centre part having the longitudinal centre axis thereof transversely disposed in relation to the centre axis of the centre part, whereby the distance, at which the rolls are disposed in relation to each other around the centre part, is selected in such a way that the rolls, seen from a point on an extension line of the center axes of the centre part in a direction towards the wheel, together form an unbroken periphery of the wheel.

Another purpose of the present invention is to accomplish smooth motion by driving on a hard base by permitting only one roll at a time to engage the base during the driving. According to the invention this is made possible by selecting the angle between the centre axis of each roll and the centre part, the length of the rolls and/or the distance between the bearings of the adjacent rolls on the centre part in such a manner, that each roll, seen from the said point and in a direction towards the wheel, essentially begins where the adjacent roll terminates.

In order to obtain the required grip, especially during driving on a soft base, according to the invention the outer side of each roll is broken by recesses directed peripherally or axially in relation to the centre axis thereof.

Under severe driving conditions it is required that the rolls withstand heavy loads and according to the invention each roll is consequently formed from a homogenous material. In case of heavy vehicles it is also essential that the rolls be especially designed to withstand wear and thus each roll has an outer wear layer of a hard material.

In order to obtain a smooth motion on a hard and uneven base it is preferable that the rolls are formed from an elastic material and to further improve the elasticity of the rolls each roll is formed with a number of inner channels preferably directed parallel to the centre axis thereof.

Finally, in order to enable convenient driving of heavy and fast vehicles on a flat roadway according to the invention each roll is provided with at least one closable chamber for compressed air. Hereby it is especially desired to give the roll the shape of a tubeless tire and as a consequence thereof each roll is formed with an inner chamber opening against the throughpassing centre axis and the roll sealingly engages this axis on both sides of the chamber to define a closed chamber for compressed air.

Vehicles of the type disclosed in the introduction are well suited for driving on an uneven base and especially for ground or terrain driving. The purpose of the present invention is also, under such driving conditions, to prevent deformation of the bearings for the rolls, when the wheels engage stones and other obstructions in the terrain, especially by laterally driving. According to the invention this is accomplished by forming each roll into two parts, said parts being placed on both sides of a bracket for the centre axis of the roll, and said bracket being positioned in the middle and extending from the centre part.

Figure 2:
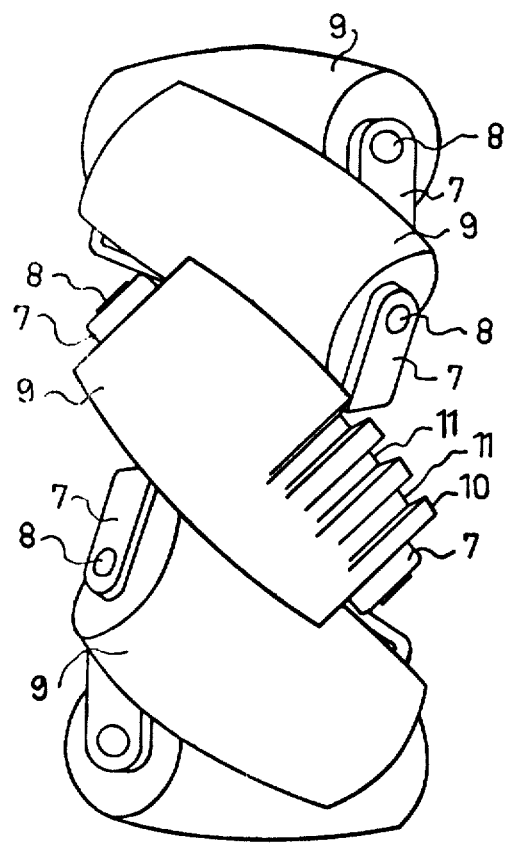
Figure 3:
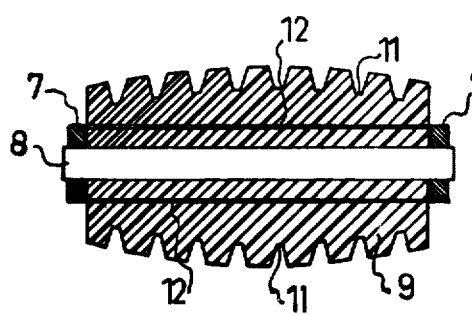
Figure 4:
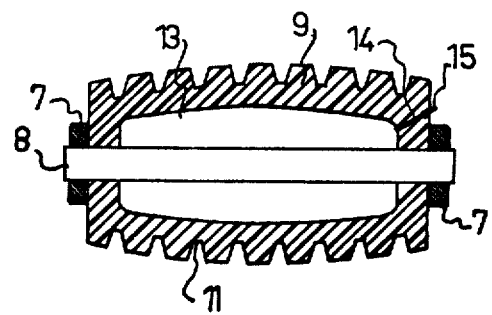
Figure 5:
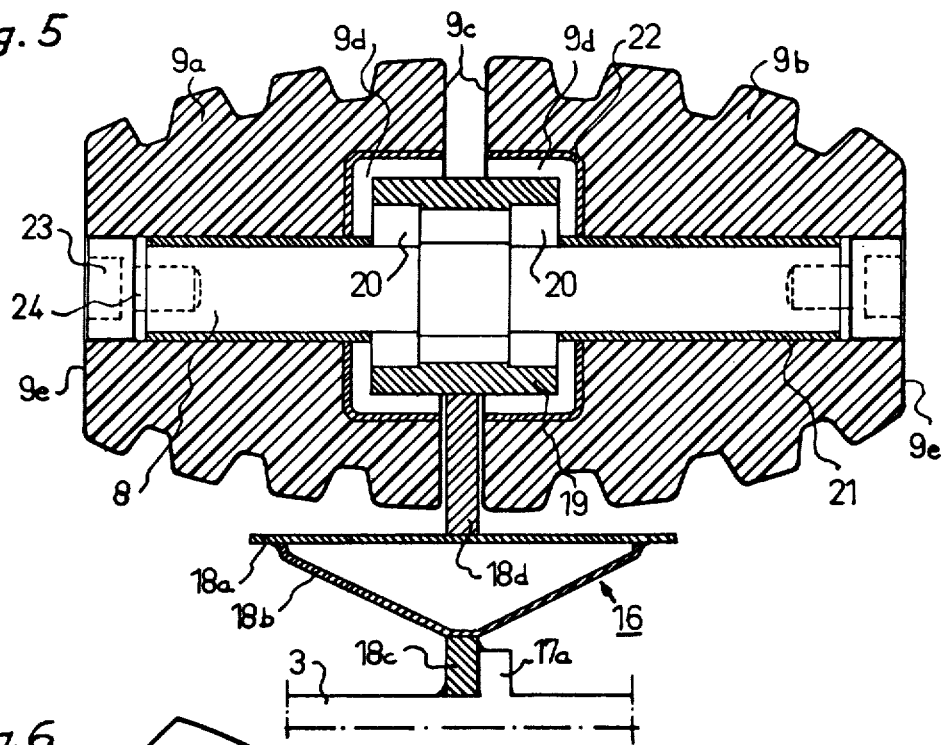
Figure 6:
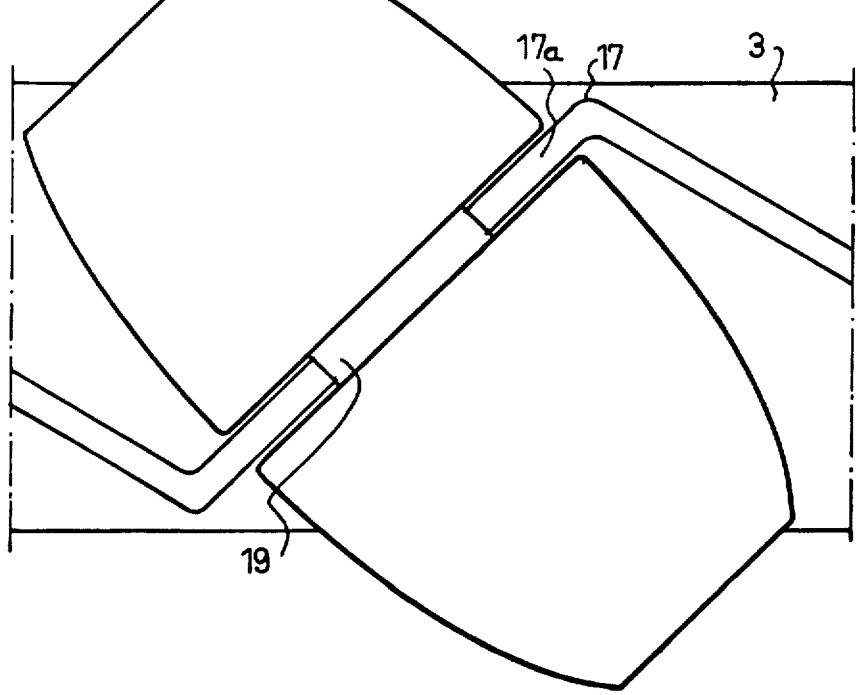

The invention is described in further detail with reference to the accompanying drawings illustrating an examplifying embodiment of the wheel, two alternative embodiments of the roll and a device for journalling the roll on the centre part. FIG. 1 illustrates a side view of the wheel according to the invention, FIG. 2 shows the same wheel in a front view, FIG. 3 illustrates a section through a roll having longitudinal channels, FIG. 4 shows a section of a roll having a chamber for compressed air, FIG. 5 also shows a section through a roll and the journalling device thereof and FIG. 6 illustrates a front view of the structure of a bracket for attaching the roll to the centre part, said bracket being positioned in the middle.

To drive a course stable vehicle in any desired direction it is essential to mount the wheels to rotate individually and journalled in bearings and furthermore it is required that the wheels or the pair of wheels may be rotated in different directions in relation to each other and at different rates of rotation. As a consequence each wheel or pair of wheels is connected to the driving assembly of the vehicle through a separate gearing device constructed in manner known per se. By driving in the normal directions straight forwardly or backwardly all wheels are driven to rotate at the same rate, and in case the vehicle is to be turned around its own vertical centre axis the front wheel pair is brought to rotate in the opposite direction in relation to the direction of rotation in which the rear wheel pair is rotating. The directions of rotation on and/or the rate of rotation of the wheels or the pair of wheels may also be adjusted to drive the vehicle diagonally forwardly or backwardly but also straight in the lateral direction; in other words in any desired direction.

FIG. 1 illustrates an embodiment of a wheel generally designated by reference numeral 1 and intended to drive a vehicle movable in the said manner. The wheel 1 is bearingly mounted in a manner known per se on a rotatable centre axis 2 extending outwardly from the side of the vehicle and includes a centre part 3 having a bearing casing 4 dimensioned to bear on the axis 2. The centre part 3 may also comprise a wheel hub of conventional design. A number of ground engaging means are distributed around the same, each means being disposed on a pivotaxis 8 the end thereof being journalled in flange shaped brackets 7 extending from the centre part 3. The brackets 7 are dimensioned according to the type of the vehicle and in case the wheel 1 is intended for use with light vehicles they may be integrally formed with the centre part.

In using the said wheel it is essential to obtain an unbroken wheel periphery to enable smooth and bump-free motion. This is in other words a condition required to obtain an acceptable driving comfort by driving on a hard base, for example on a flat, covered roadway. Furthermore, an unbroken wheel periphery is required to make the wheel withstand relatively high vehicle speeds under variable driving conditions. As a result each ground engaging means 6 is shaped as an elongated roll 9 having the outer side 10 thereof convexely vaulted in the longitudinal direction of the roll. The brackets 7 for each roll 9 are displaced in relation to each other on the centre part 3 so that the centre axis 8 of the roll 9 defines an angle of 30° – 60°, preferably of 45°, with the centre axis 2 of the centre part, and said angle preferably being the same between each axis 8 of all the rolls and the centre axis 2. Furthermore the attachment holes 7a for the axis 8 on the brackets 7, and thereby also the rolls 9, are positioned on such a distance to each other, that the outer side 10 of each roll defines a part of the outer periphery of the wheel 1 and the outer sides 10 of the rolls complement each other around the centre part 3 so that an unbroken wheel periphery is formed around the wheel 1 seen in the side direction and form a point on an imagined outward extension of the centre axis 2 of the centre part 3.

In order to obtain a soft motion during driving on a hard base the rolls 9 may be formed in an elastic material. Hereby, preferably the angle between the centre axis 8 and 2 of each roll 9 and the centre part 3, the length of the roll 9 and/or the distance between the adjacent bearings 7 of the adjacent rolls 9 on the centre parts, is selected in such a manner that each roll 9, seen from said point and in a direction towards the wheel 1, begins where the adjacent roll 9 terminates. However, the rolls may be disposed to overlap each other and they may also be arranged at a distance from each other, for example at a distance that corresponds to the transverse recesses in the roll, without degeneration of the smooth driving motion of the wheel.

By selecting a large angle between the centre axis 8 of the roll 9 and the centre axis 2 of the centre part 3 the rolls 9 may also be brought to stand idle during normal driving straight forwardly or backwardly. This may be an advantage during certain driving conditions since the wheel thereby obtains a definite driving motion especially at relatively high driving speeds.

In an exemplifying embodiment the rolls 9 have recesses 11 in the outer side 10 thereof, said recesses being directed perpendicular to the centre axis 8 of the roll and running unbroken around the roll; such a structure is marked on one of the rolls 9 in FIG. 2. Furthermore, each roll 9 is formed in a homogenous material and the outer side thereof may be covered by an outer wear layer made of a hard material. The said structure results in that the roll 9 obtains the required grip on different bases and that the same may withstand heavy loads and furthermore exhibits hardwearing engaging surfaces.

FIG. 3 illustrates an embodiment of a roll 9 according to which said roll is formed of an elastic material in order to obtain a soft driving motion on a hard base. In connection hereto it is preferable to dispose inner channels 12 in the roll 9 preferably directed parallel to the hole for the centre axis 8 whereby the elastic property of the roll is improved.

In case of large and fast vehicles it is possible to design the roll 9 as a tubeless tire, schematically illustrated in FIG. 4. Hereby the roll has an inner chamber 13 opening toward the centre axis 8 and sealingly engaging the axis on both sides of the chamber 13. In order to pump compressed air into the chamber 13 a channel 14 leads from the chamber 13 through the roll to the short side thereof. A check valve 15 or the like is disposed within said channel 14 to open when pumping of the roll and to close for preventing back flowing of the air, that has been pumped into the channel. In case of such a structure the roll 9 is preferably having inner reinforcements 5 (not shown) to permit the required stability. Such rolls, called pneumatic rolls, in a ready pumped and securely sealed state are also suited to be used for wheels in military vehicles in that the same may be rapidly replaced in case of punctures.

According to the embodiments illustrated in FIGS. 1 – 4 the brackets 7 define pair-wise fork-shaped attachment means for the rolls 9. When driving on an uneven base, and especially when driving in the lateral directions, there is a risk that the brackets 7 may bump into stones or other bigger obstruction in the terrain and thereby become deformed. Therefor, the rolls according to a further exemplifying embodiment, illustrated in FIGS. 5 and 6, comprise two parts 9a and 9b, which are connected to the centre part by a bracket 16 for the centre axis 8 thereof, said bracket being positioned in the middle and generally designated by 16. In this embodiment the bracket 16 comprise a flange 17 extending from the periphery of the centre part 3, said flange running around the same and the centre axis 8 of the parts 9a, 9b being directly connected to the same, or the bracket 16 partly comprises this flange 17 and partly an arm 18 being extendingly disposed on the flange and preferably welded to the same, said centre axis 8 being positioned on said arm, The arm 18 includes a semi-circular sheet 18a connected to the flange 17 through plates 18b, 18c a socket 18d being connected to said plate and extending between the parts 9a, 9b of the roll and holding the axis 8. Preferably, the flange 17 is having straight sections 17a perpendicular to the centre axis 2 of the roll 9.

To obtain sufficiently stable bearing of the roll 9 the axis 8 is fixedly secured to the bracket 16 and the parts 9a, 9b are mounted on the axis by plain bearings, pin bearings or the like (not shown). In an alternate embodiment a bearing casing 19 is fixedly secured to the bracket 16 and two roll bearings 20 are positioned at a distance from each other in said casing to journal the axis 8.

To enable positioning of the parts 9a, 9b of the rolls as close to the bracket 16 as possible but while maintaining the sufficient length of bearing casing 19, the inner surfaces 9c of the parts 9a, 9b have axial recesses 9d into which the casing 19 extends. The parts 9a, 9b of the roll are fixedly beared on the axis 8 through casings 21 and casings 22 are fixedly secured to these, said casings 22 defining walls to the recesses 9d. The casings 21 are held in place on the axis 8 by bolts 23 screwed into the axis 8 and eventually engaging the casings through washers 24.

In the said two-parts embodiment of the rolls 9 it is important that the centre axis 8 or bolts 23 or the like disposed on the outer ends thereof do not bump into stones or the like. Consequently, the parts 9a, 9b are so designed that the gable sides 9e thereof lie outside the axis 8 and the bolts 23, which means that the same are positioned in the roll, and protected thereby.

According to the invention it is also desired to have a wheel diameter as big as possible in order to obtain a smooth driving motion of the vehicle. Furthermore, it is essentially that the wheel obtains a sufficient grip on the base and therefor it is suitable to design the wheel either having a relatively large width and a small number of rolls or having a relatively small width and a great number of rolls. By using a definite relation between the diameter of the wheel, the width of the wheel and the number of rolls for example the number of required rolls may be calculated for a selected diameter and width of the wheel. Thus, it is possible to decide the number of rolls of the dimensions of the wheel in case the two other informations are given, which means that the design of the wheel may be decided with due respect paid to preferable driving motion and grip on the ground for vehicles of considerably different types and for different fields of application.

The invention is not limited to the exemplifying embodiment but may be modified within the scope of the following claims. Thus, the rolls 9 may be formed of a homogenous metallic material and the recesses in the outer sides of rolls may be directed parallel to the centre axis of the rolls.

What is claimed is:

1. Improvements in wheels of a course stable self-propelling vehicle, being movable in any desired direction on the ground or another base, whereby each wheel (1) includes a centre part (3) mounted on a centre axis (2) being rotatably and transversely disposed in relation to the side of the vehicle and further includes a plurality of ground engaging means rotatably mounted on the centre part (3) and distributed around the same, characterized in that each ground engaging means is designed as an elongated roll (9) having the outer side thereof convexely vaulted in the longitudinal direction thereof, and that each roll (9) is disposed in the centre part (3) having the longitudinal centre axis (8) thereof obliquely positioned in relation to the centre axis (2) of the centre part (3) and that the angle between the centre axis of each roll (9) and the centre part (3) and furthermore the distance at which the rolls are positioned in relation to each other around the centre part is selected in such a manner, that the rolls, seen from a point on an extension of the centre axis of the centre part and in a direction towards the wheel, together define an unbroken wheel periphery.

2. A device according to claim 1, characterized in that the angle between the centre axis (8 and 2) of each roll (9) and the centre part (3), the length of the rolls (9) and/or the distance between the bearings (7) of the adjacent rolls (9) on the centre part (3), are selected in such a manner that each roll (9), seen from said point and in a direction towards the wheel (1), essentially begins where the adjacent roll (9) terminates.

3. A device according to claim 1, characterized in that the outer side of each roll (9) is broken by recesses (11) directed peripherally in relation to the centre axis (8) thereof.

4. A device according to claim 1, characterized in that each roll (9) is formed of a homogenous material.

5. A device according to claim 1, characterized in that each roll (9) has an outer wear layer of a hard material.

6. A device according to claim 1, characterized in that each roll (9) is made from an elastical material.

7. A device according to claim 6, characterized in that each roll (9) has a number of inner channels (12) preferably directed parallel to the centre axis (8) thereof.

8. A device according to claim 6, characterized in that each roll (9) has at least one closable chamber (13) for compressed air.

9. A device according to claim 8, characterized in that each roll (9) has an inner chamber (13) open towards the passing-through centre axis (8) thereof, whereby the roll (9) on both sides of the chamber (13) sealingly engages this axis (8) to define a closed chamber for compressed air.

10. A device according to claim 1, characterized in that each roll (9) comprises two parts (9a, 9b) and that said parts (9a, 9b) are disposed on a common centre axis (8) on both sides of a bracket (16) for the axis (8), said bracket extending from the centre part (3).

11. A device according to claim 10, characterized in that the parts (9a, 9b) of the roll are rotatably mounted on the centre axis (8) and said axis is fixedly secured to the bracket (16).

12. A device according to claim 10, characterized in that the parts (9a, 9b) of the roll are fixedly secured to the centre axis (8) and said axis is rotatably mounted in a bearing casing (19) through roll bearings (20) or the similar positioned at a distance from each other, whereby the bearing casing (19) is fixedly secured to the bracket (16).

13. A device according to claim 12, characterized in that the parts (9a, 9b) of each roll has inner gable sides (9c) positioned closely to the bracket (16) and that axial recesses (9d) are formed in said gable sides (9c), whereby the bearing casing (19) extends into said recesses.

14. A device according to claim 10, characterized in that the parts (9a, 9b) of the roll are so disigned that after the mounting of the parts on the centre axis (8)

the gable sides (9e) thereof are positioned outside this axis (8) and also outside retaining means (22) to secure the parts (9a, 9b) to the axis (8).

15. A device according to claim 10, characterized in that the bracket (16) comprises a flange (17) connected to the centre part (3) in an extending manner and running in a zig-zag line around the periphery of the same, whereby the flange (17) has straight sections (17a) for each roll (9) directed perpendicular to the centre axis (8) of the roll.

* * * * *